C. H. CLAUDEL.
CARBURETER FOR LIQUID FUEL.
APPLICATION FILED NOV. 14, 1917.
1,271,434.
Patented July 2, 1918.
2 SHEETS—SHEET 1.
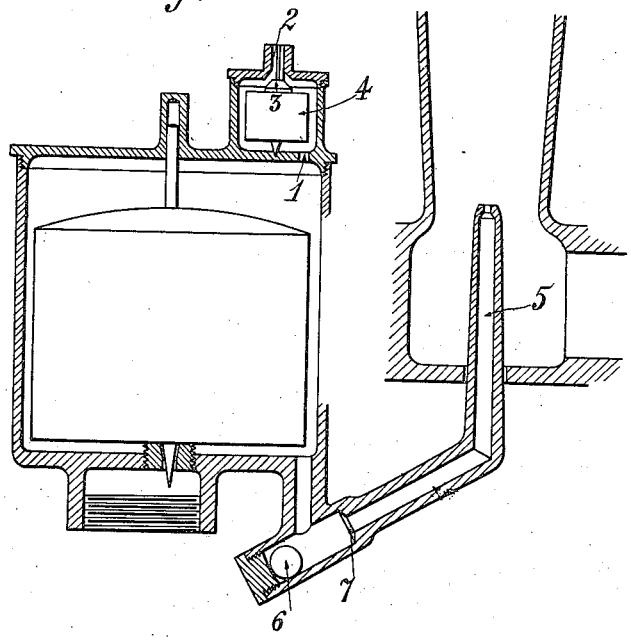
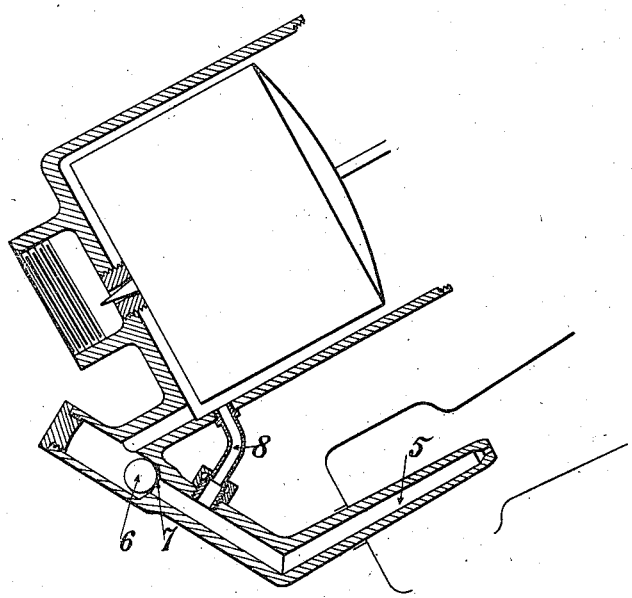
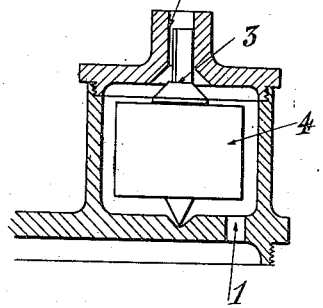
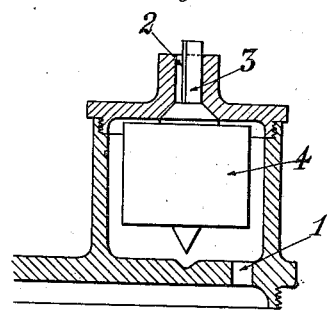
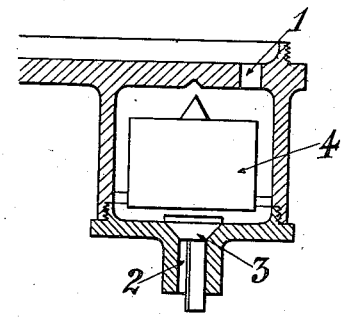
Inventor
Charles Henri Claudel
by O'Donnell
his Attorney

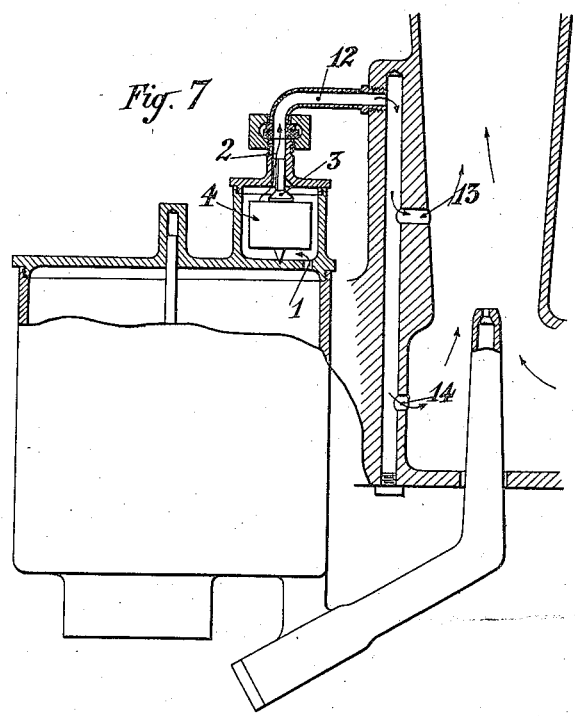
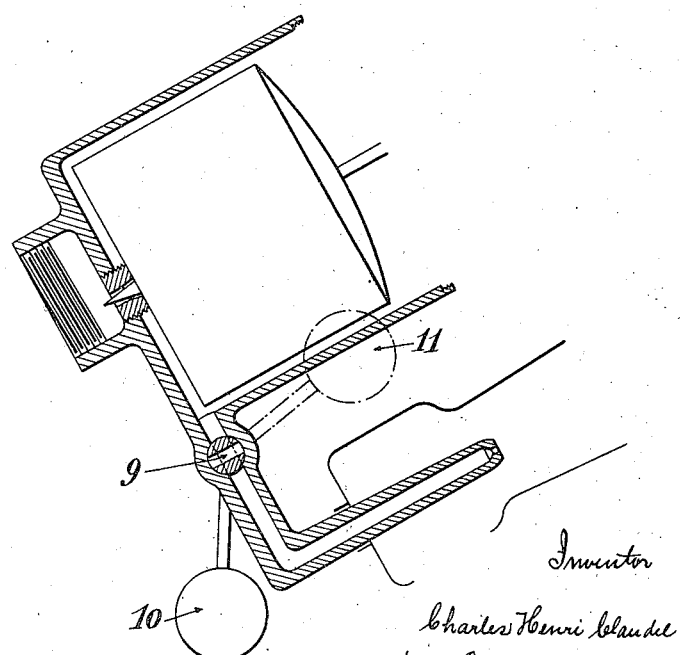

UNITED STATES PATENT OFFICE.

CHARLES HENRI CLAUDEL, OF LEVALLOIS-PERRET, FRANCE.

CARBURETER FOR LIQUID FUEL.

1,271,434. Specification of Letters Patent. Patented July 2, 1918.

Application filed November 14, 1917. Serial No. 202,020.

*To all whom it may concern:*

Be it known that I, CHARLES HENRI CLAUDEL, citizen of the Republic of France, residing at 41 Rue des Arts, Levallois-Perret, Seine, in the Republic of France, have invented new and useful Improvements in Carbureters for Liquid Fuel, of which the following is a specification.

This invention relates to improvements in carbureters for liquid fuel.

Carbureters feeding explosion motors generally comprise a constant level or float chamber assuring the feed of the liquid fuel to one or more nozzles. To allow this constant level chamber to operate regularly it is necessary that it should be in communication with the atmosphere and this result is obtained in present practice by forming an air hole in the top of the chamber. This arrangement has great inconveniences. In effect in case of non-operation of the parts assuring the regularity of the level, the liquid fuel flows out through the air hole causing not only loss of fuel but also risk of fire.

The present invention is for the purpose of preventing the liquid fuel from improperly escaping from the constant level chamber.

1. In case of failure of operation of the constant level apparatus itself.

2. In case the carbureter leaves its normal position of working, for example in the case of an upset.

This result is obtained by providing the constant level device with parts which permit when the constant level mechanism does not operate automatically obstructing the channel or channels communicating with the atmosphere and the conduit or conduits communicating with the nozzles or ajutages.

In the annexed drawings is shown diagrammatically and by way of example a method of carrying out the invention.

Figure 1 illustrates a constant level chamber of a carbureter provided with safety devices according to the invention.

Fig. 2 is a detail view of the device which allows of obstructing the air communication, this device being in the position which it occupies when the carbureter operates regularly.

Fig. 3 shows this device in the obturating position when the constant level chamber is flooded.

Figs. 4 and 5 show in the case of an upset the positions of devices obstructing the feed to the nozzles and the communication with the atmosphere.

Fig. 6 shows another arrangement which in the case of an upset automatically obstructs the feed conduit of the nozzles.

Fig. 7 shows an obstruction device for the air passage in the case where the latter is connected to the suction pipe of the carbureter.

In Fig. 1 it can be seen that the communication with the atmosphere is established by the orifice 1 and the annular space 2 formed around the rod of the small valve 3 which in normal operation has the position shown in Fig. 2.

If for any reason the constant level device does not work and if the liquid fuel overfills the constant level chamber, a small float 4 rises and brings the small valve 3 into the position shown in Fig. 3. In this position the valve prevents the fuel flowing out of the constant level chamber.

The conduit conducting the fuel to the nozzle 5 (Fig. 1) is provided with an inclined chamber at the lower part of which during regular operation the ball 6 remains seated, immediately if by any accident the carbureter is displaced for a certain angle with respect to the vertical, the ball 6 takes its place on the seat 7 and obstructs the conduit feeding the liquid to the nozzle 5. Fig. 4 shows the position of obstruction.

In the case where it is desired to prevent the immediate stoppage of the motor it will suffice to provide a reduced feed represented by a small channel 8 just sufficient for feeding the motor at slow speed.

In the case of reversal of the motor the obstruction of the air orifice is obtained as indicated in Fig. 5 by the valve 3 which also prevents in this case all loss of fuel.

The ball arrangement could be replaced for example, by a plug obturator 9 the closure of which is governed by a counterweight 10 which when the carbureter works normally occupies the position 11 shown in dotted lines; it is evident that any other releasing device could be employed without departing from the scope of the invention.

Certain carbureters have the constant level chamber connected to the air suction pipe by one or two channels connected or otherwise, similar to those indicated by 12, 13 and 14 in Fig. 7; in this arrangement grave inconvenience results if the liquid fuel overflows the suction pipe of the carbureter by these channels; it is to prevent this inconvenience, that, as shown in Fig. 7, the arrangement of valve and float obstruction previously indicated can be utilized.

It is understood that the devices described above and shown in the drawing are given by way of example and that without departing from the invention, the various members of these devices can be modified as regards their form, dimensions and details of construction.

Having now described my invention, what I claim as new and desire to secure by Letters Patent is:

1. In the constant level apparatus of a carbureter, the combination of: a level constant chamber, an air communication provided at the top of this chamber, means obstructing automatically this air communication when the carbureter leaves its normal position or when the constant level apparatus does not work, a feed conduit of the nozzles provided at the bottom of the level constant chamber, and means obstructing automatically this feed conduit when the carbureter leaves its normal position, substantially as described and for the purpose set forth.

2. In the constant level apparatus of a carbureter, the combination of: a level constant chamber, a smaller chamber arranged at the upper part of this level constant chamber and in communication with the said level constant chamber, a float located in the said small chamber, an air conduit provided at the top of this small chamber, a valve supported by the aforementioned float and having its rod guided into the said air conduit, a feeding conduit of the nozzles provided at the bottom of the constant level chamber, and means obstructing automatically this feed conduit when the carbureter leaves its normal position, substantially as described and for the purpose set forth.

3. In the constant level apparatus of a carbureter, the combination of: a level constant chamber, a smaller chamber arranged at the upper part of this level constant chamber and in communication with the said level constant chamber, a float located in the said small chamber, an air conduit provided at the top of this small chamber, a valve supported by the aforementioned float and having its rod guided into the said air conduit, a pipe provided at the bottom of the constant level chamber, an inclined chamber arranged at the lower part of this pipe, a ball provided in this inclined chamber, and a feed conduit of the nozzles provided at the upper part of the said inclined chamber, substantially as described and for the purpose set forth.

4. In the constant level apparatus of a carbureter, the combination of: a level constant chamber, a smaller chamber arranged at the upper part of this level constant chamber and in communication with the said level constant chamber, a float located in the said small chamber, an air conduit provided at the top of this small chamber, a valve supported by the aforementioned float and having its rod guided into the said air conduit, a pipe provided at the bottom of the constant level chamber, an inclined chamber arranged at the lower part of this pipe, a ball provided in this inclined chamber, a feed conduit of the nozzles provided at the upper part of the said inclined chamber and a small feed channel provided between the aforementioned pipe and the said feed conduit, substantially as described and for the purpose set forth.

In testimony whereof I have signed my name to this specification in the presence of two subscribing witnesses.

CHARLES HENRI CLAUDEL.

Witnesses:
 LOUIS MOSES,
 CHAS. P. PRESSLY.